(12) United States Patent
Okamoto et al.

(10) Patent No.: US 11,190,075 B2
(45) Date of Patent: Nov. 30, 2021

(54) DRIVE SYSTEM

(71) Applicant: DENSO CORPORATION, Kariya (JP)

(72) Inventors: Ryotaro Okamoto, Nisshin (JP);
Tsubasa Sakuishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 65 days.

(21) Appl. No.: 16/587,537

(22) Filed: Sep. 30, 2019

(65) Prior Publication Data
US 2020/0106320 A1 Apr. 2, 2020

(30) Foreign Application Priority Data
Oct. 1, 2018 (JP) .............................. JP2018-186937

(51) Int. Cl.
| | | |
|---|---|---|
| *H02J 7/00* | (2006.01) | |
| *H02K 3/46* | (2006.01) | |
| *H01M 10/02* | (2006.01) | |
| *B60L 53/57* | (2019.01) | |
| *B60L 50/53* | (2019.01) | |
| *H01M 10/44* | (2006.01) | |

(52) U.S. Cl.
CPC ................ *H02K 3/46* (2013.01); *B60L 50/53* (2019.02); *B60L 53/57* (2019.02); *H01M 10/02* (2013.01); *H01M 10/44* (2013.01)

(58) Field of Classification Search
None
See application file for complete search history.

(56) References Cited

U.S. PATENT DOCUMENTS

| | | | | |
|---|---|---|---|---|
| 8,669,855 | B2* | 3/2014 | Suzuki ................. | B60W 20/00 340/438 |
| 2001/0039230 | A1* | 11/2001 | Severinsky .............. | B60L 7/26 477/3 |
| 2005/0005814 | A1* | 1/2005 | Kumar ................ | B60L 15/2045 105/35 |
| 2007/0012492 | A1* | 1/2007 | Deng .................... | B60W 20/00 180/65.1 |
| 2007/0029986 | A1* | 2/2007 | Nakamura .............. | B60L 58/12 323/318 |
| 2008/0067973 | A1* | 3/2008 | Ishikawa ............... | B60L 15/007 320/104 |

(Continued)

FOREIGN PATENT DOCUMENTS

| | | |
|---|---|---|
| JP | H10-66269 A | 3/1998 |
| JP | 2013-143797 A | 7/2013 |
| JP | 2017-011993 A | 1/2017 |

*Primary Examiner* — Arun C Williams
(74) *Attorney, Agent, or Firm* — Oliff PLC

(57) ABSTRACT

A drive system to be applied to a vehicle is provided which includes a chargeable and dischargeable electric storage device, and in which the electric storage device is capable of being charged by power supply from an external power supply outside the vehicle. The drive system includes a rotating electrical machine, an inverter connected to the rotating electrical machine, a converter configured to transform a power supply voltage of the electric storage device and output the transformed power supply voltage to the inverter, and charging wirings which are capable of being electrically connected to the external power supply. The charging wirings are connected to connection points between the inverter and the converter.

4 Claims, 6 Drawing Sheets

(56) References Cited

U.S. PATENT DOCUMENTS

| | | | |
|---|---|---|---|
| 2008/0094013 A1* | 4/2008 | Su | B60L 53/24 |
| | | | 318/139 |
| 2009/0212634 A1* | 8/2009 | Kojima | B60L 58/40 |
| | | | 307/77 |
| 2009/0267412 A1* | 10/2009 | Kitanaka | B60L 50/51 |
| | | | 307/10.7 |
| 2009/0315518 A1* | 12/2009 | Soma | B60L 50/16 |
| | | | 320/134 |
| 2012/0112693 A1 | 5/2012 | Kusch et al. | |
| 2012/0123625 A1* | 5/2012 | Ueo | B60L 58/12 |
| | | | 701/22 |
| 2014/0097676 A1* | 4/2014 | Kusumi | B60L 58/13 |
| | | | 307/10.1 |
| 2018/0062402 A1 | 3/2018 | Syouda | |

* cited by examiner

DRIVE SYSTEM

CROSS-REFERENCE TO RELATED APPLICATION

The present application is based on and claims the benefit of priority from earlier Japanese Patent Application No. 2018-186937 filed Oct. 1, 2018, the description of which is incorporated herein by reference.

BACKGROUND

Technical Field

The present disclosure relates to a drive system.

Related Art

Conventionally, an external power supply which is provided outside a vehicle and can quickly charge an in-vehicle electric storage device formed with a series connection of a plurality of battery cells is known. In such an external power supply, in a case where a supply voltage of the external power supply is a high voltage, the whole of the electric storage device is charged at the same time, while, in a case where the supply voltage of the external power supply is a low voltage, the electric storage device is divided into a plurality of blocks, and the respective blocks are sequentially charged. By this means, even in a case where the supply voltage of the external power supply is a low voltage, it is possible to charge the electric storage device.

SUMMARY

As an aspect of the present disclosure, a drive system to be applied to a vehicle is provided which includes a chargeable and dischargeable electric storage device, and in which the electric storage device is capable of being charged by power supply from an external power supply outside the vehicle. The drive system includes: a rotating electrical machine; an inverter connected to the rotating electrical machine; a converter configured to transform a power supply voltage of the electric storage device and output the transformed power supply voltage to the inverter; and charging wirings which are capable of being electrically connected to the external power supply. The charging wirings are connected to connection points between the inverter and the converter.

DETAILED DESCRIPTION OF THE PREFERRED EMBODIMENTS

Conventionally, an external power supply which is provided outside a vehicle and can quickly charge an in-vehicle electric storage device formed with a series connection of a plurality of battery cells is known (for example, JP-A-10-99269). In such an external power supply, in a case where a supply voltage of the external power supply is a high voltage, the whole of the electric storage device is charged at the same time, while, in a case where the supply voltage of the external power supply is a low voltage, the electric storage device is divided into a plurality of blocks, and the respective blocks are sequentially charged. By this means, even in a case where the supply voltage of the external power supply is a low voltage, it is possible to charge the electric storage device.

To divide an electric storage device into a plurality of blocks and sequentially charge the respective blocks, it is necessary to mount a plurality of converters for charging to charge the respective blocks and connect the respective converters for charging to the corresponding blocks with wirings. Therefore, problems occur that an internal structure of the electric storage device becomes complicated, and it takes higher cost. A technique is desired which is capable of appropriately charging the electric storage device even in a case where a supply voltage of an external power supply is low and the supply voltage of the external power supply is lower than a power supply voltage of the electric storage device.

The present disclosure has been made in view of the above-described circumstances, and it is an object of the present disclosure to provide a drive system which is capable of appropriately charging an electric storage device even in a case where a supply voltage of an external power supply is lower than a power supply voltage of the electric storage device.

First Embodiment

A first embodiment which embodies a drive system according to the present embodiment will be described below with reference to the drawings. A drive system 70 of the present embodiment is mounted in a vehicle.

Figure 1:
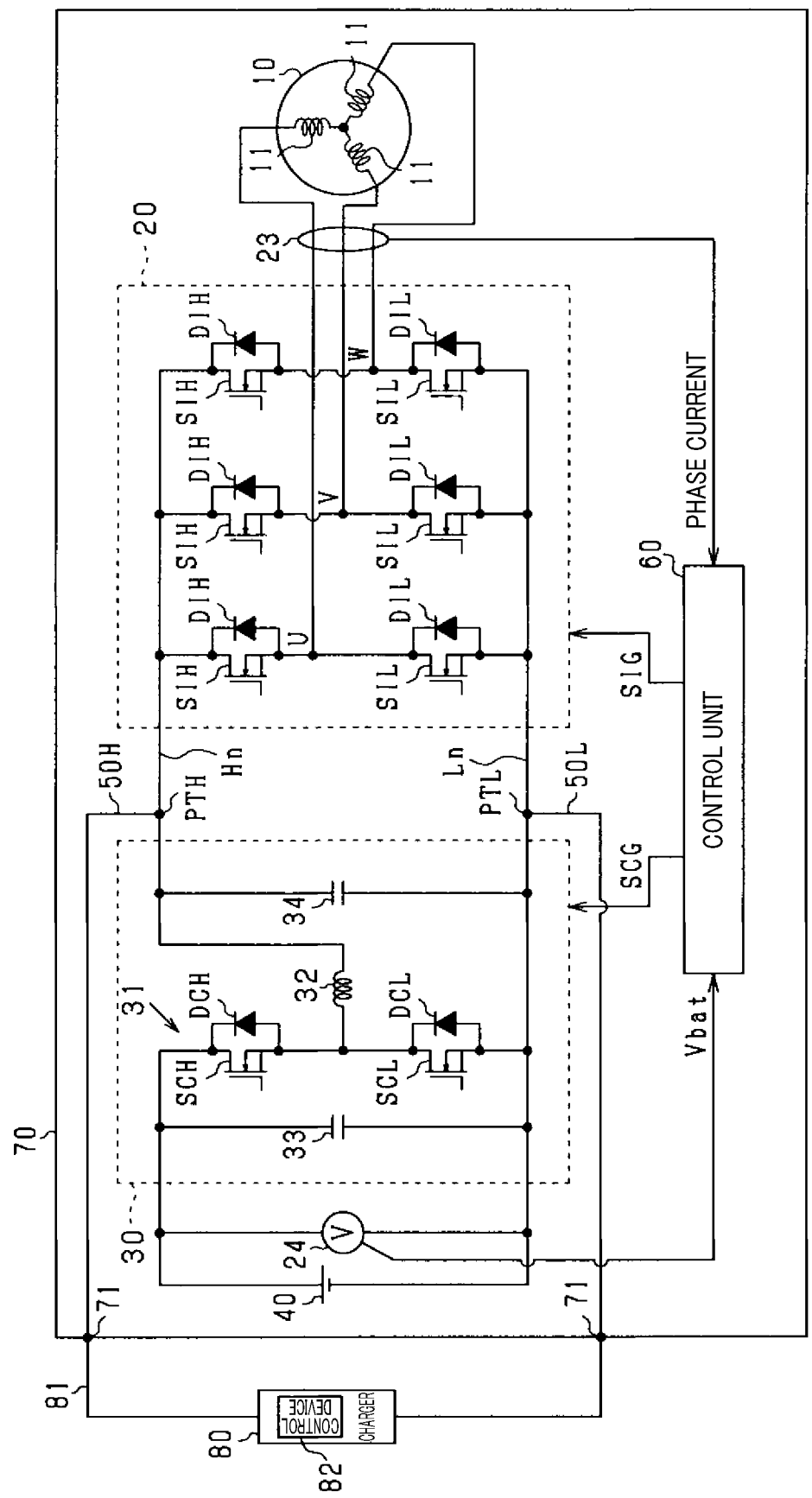
FIG. 1 is an overall configuration diagram of a control system according to a first embodiment.

As illustrated in FIG. 1, the drive system 70 includes a rotating electrical machine 10, an inverter 20, a converter 30, a DC power supply 40 as an electric storage device, charging wirings 50H and 50L, and a control unit 60 which controls the rotating electrical machine 10. In the present embodiment, the rotating electrical machine 10 includes three-phase windings 11 which are star-connected. A rotor of the rotating electrical machine 10 is connected so as to be able to transmit power to drive wheels of a vehicle. The rotating electrical machine 10 is, for example, a synchronizer.

The rotating electrical machine 10 is connected to the DC power supply 40 via the inverter 20 and the converter 30. In the present embodiment, the DC power supply 40 is a chargeable and dischargeable storage battery. The DC power supply 40 can be charged by power supply from a charger 80 as an external power supply provided outside the vehicle.

The inverter 20 includes series connections in which an upper arm switch SIH and a lower arm switch SIL are connected in series, for each of U, V and W phases. In the present embodiment, as the respective switches SIH and SIL, N-channel MOSFETs which are unipolar devices and which are SiC devices are used. The upper arm switch SIH includes an upper arm diode DIH as a body diode, and the lower arm switch SIL includes a lower arm diode DIL as a body diode.

The inverter 20 is connected to the rotating electrical machine 10 and the converter 30. Specifically, in each phase, a first end of the winding 11 of the rotating electrical machine 10 is connected to a connection point between a source of the upper arm switch SCH and a drain of the lower arm switch SCL. Second ends of the windings 11 of the respective phases are connected at a neutral point.

The converter 30 is a voltage step-down type DC-DC converter which steps down (converts) a power supply voltage Vbat of the DC power supply 40 and outputs the stepped-down voltage to the inverter 20. The converter 30 includes a series connection 31 of the upper arm switch SCH and the lower arm switch SCL, a smoothing reactor 32, and first and second smoothing capacitors 33 and 34. In the present embodiment, as the respective switches SCH and SCL, N-channel MOSFETs which are unipolar devices and which are SiC devices are used. The upper arm switch SCH includes an upper arm diode DCH as a body diode, and the lower arm switch SCL includes a lower arm diode DCL as a body diode.

To a drain of the upper arm switch SCH, a positive electrode terminal of the DC power supply 40 is connected, and a high-voltage side terminal of the first smoothing capacitor 33 is connected. To a connection point between a source of the upper arm switch SCH and a drain of the lower arm switch SCL, a first end of the smoothing reactor 32 is connected. To a second end of the smoothing reactor 32, a high-voltage side terminal of the second smoothing capacitor 34 is connected, and drains of the upper arm switches SIH in the respective phases of the inverter 20 are connected via a high-voltage side connecting wire Hn. To a source of the lower arm switch SCL, a negative electrode terminal of the DC power supply 40 and low-voltage side terminals of the first and second smoothing capacitors 33 and 34 are connected, and sources of the lower arm switches SIH in the respective phases of the inverter 20 are connected via a low-voltage side connecting wire Ln.

The drive system 70 includes a phase current detecting unit 23 and a power supply voltage detecting unit 24. The phase current detecting unit 23 detects a current corresponding to at least two phases among currents of the respective phases flowing to the rotating electrical machine 10. The power supply voltage detecting unit 24 detects a terminal voltage of the first smoothing capacitor 33 as the power supply voltage Vbat. Detection values of the respective detecting units 23 and 24 are input to the control unit 60.

The control unit 60 controls the inverter 20 and the converter 30 so as to adjust a control amount of the rotating electrical machine 10 to a commanded value on the basis of the acquired detection values. The control amount is, for example, torque. The control unit 60 outputs drive signals SIG respectively corresponding to the upper and lower arm switches SIH and SIL to the upper and lower arm switches SIH and SIL so that the upper and lower arm switches SIH and SIL are alternately put into an on state while dead time is provided in control of the inverter 20. The drive signals SIG are one of an on command which gives an instruction to switch a state of the switch to an on state, and an off command which gives an instruction to switch the state to an off state. Note that, in the present embodiment, the on state corresponds to a "closed state", and the off state corresponds to an "open state".

Further, the control unit 60 outputs drive signals SCG respectively corresponding to the upper and lower arm switches SCH and SCL to the upper and lower arm switches SCH and SCL in control of the converter 30. In a case where the DC power supply 40 discharges, a period during which the upper and lower arm switches SCH and SCL are put into on states is set in accordance with a ratio of an output voltage Vout to the inverter 20 with respect to the power supply voltage Vbat (hereinafter, a voltage step-down ratio) Vout/Vbat. For example, if a switching period in a case where the DC power supply 40 discharges is set as Ta, a discharge on state period Tout of the upper arm switch SCH is expressed as expression 1.

$$Tout = Vout/Vbat \times Ta \quad \text{(expression 1)}$$

Note that functions provided by the control unit 60 can be provided by, for example, software recorded in a tangible memory device, a computer which implements the software, hardware or a combination thereof.

The charging wirings 50H and 50L are wirings which can be electrically connected to the charger 80, and include a high-voltage side charging wiring 50H and a low-voltage side charging wiring 50L. First ends of the charging wirings 50H and 50L are connected to a charging terminal 71 of the vehicle. The charger 80 includes a charging adapter 81, and is configured to be able to supply electrical power to the vehicle by connecting the charging adapter 81 to the charging terminal 71.

The charger 80 includes a control device 82, and is configured to be able to adjust a supply voltage Vcha and a supply current Icha. Further, the control device 82 is configured to be able to perform communication with the control unit 60 of the drive system 70.

By the way, in a case where the supply voltage Vcha is higher than the power supply voltage Vbat, the charger 80 charges the DC power supply 40 by supplying the supply current Icha to the DC power supply 40 of the vehicle by utilizing a difference of the voltages. Therefore, in a case where the supply voltage Vcha is lower than the power supply voltage Vbat, the charger 80 cannot charge the DC power supply 40. To deal with a voltage of the DC power supply 40 becoming higher in recent years, a technique of charging the DC power supply 40 even in a case where the supply voltage Vcha is lower than the power supply voltage Vbat is desired.

For example, by dividing the DC power supply 40 into a plurality of blocks and sequentially charging the respective blocks, even in a case where the supply voltage Vcha is lower than the power supply voltage Vbat, it is possible to charge the DC power supply 40. However, since it is necessary to mount a plurality of converters for charging to charge the respective blocks within the drive system 70 and connect the respective converters for charging to the corresponding blocks with wirings, there are problems that an internal structure of the DC power supply 40 becomes complicated, and it takes higher cost.

In the drive system 70 of the present embodiment, second ends of the charging wirings 50H and 50L are connected to connection points PTH and PTL between the inverter 20 and the converter 30. Specifically, the second end of the high-voltage side charging wiring 50H is connected to a high-voltage side connection point PTH located between the inverter 20 and the converter 30 on a high-voltage side connecting wire Hn. Further, the second end of the low-voltage side charging wiring 50L is connected to a low-voltage side connection point PTL located between the inverter 20 and the converter 30 on a low-voltage side connecting wire Ln.

Therefore, in a case where the DC power supply 40 is charged using the charger 80, it is possible to charge the DC power supply 40 using the converter 30. Therefore, in a case where the supply voltage Vcha is lower than the power supply voltage Vbat, it is possible to step up the supply voltage Vcha using the converter 30, so that it is possible to make the stepped-up voltage Vup, which is obtained by stepping up the supply voltage Vcha, higher than the power supply voltage Vbat. As a result, even in a case where the supply voltage Vcha is lower than the power supply voltage Vbat, it is possible to charge the DC power supply 40.

Figure 2:
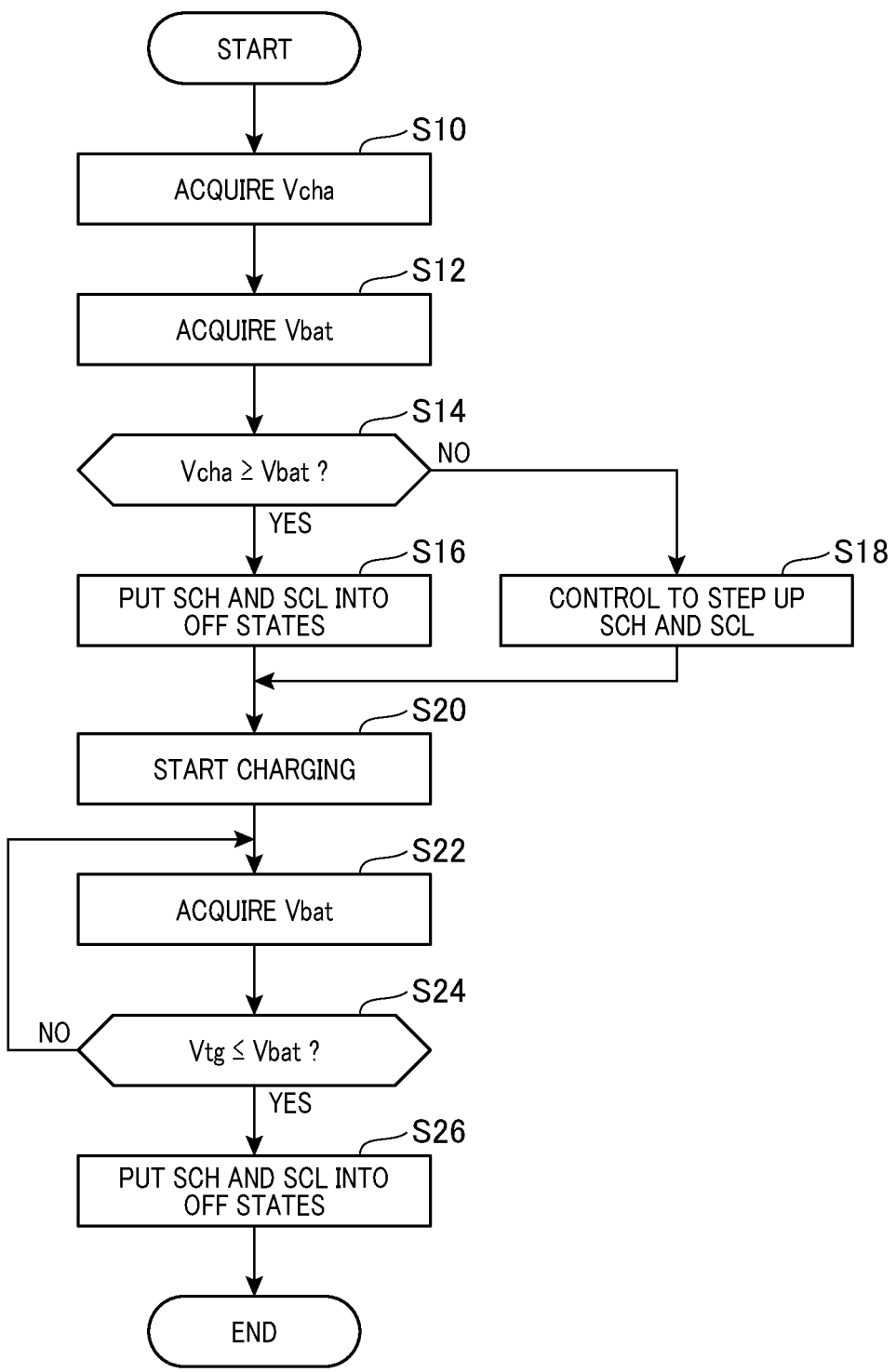
FIG. 2 is a flowchart of charging control processing according to the first embodiment.

FIG. 2 illustrates a flowchart of charging control processing of the present embodiment. The charging control processing is processing of controlling the converter 30 so as to make a voltage supplied from the charger 80 higher than the power supply voltage Vbat and output the voltage to the DC power supply 40 when the DC power supply 40 is charged by electrical power supply from the charger 80.

Here, the voltage supplied from the charger 80 means the supply voltage Vcha in a case where the supply voltage Vcha is equal to or higher than the power supply voltage Vbat, and means the stepped-up voltage Vup in a case where the supply voltage Vcha is lower than the power supply voltage Vbat. The charging control processing is performed by the control unit 60 when the DC power supply 40 is charged by the charger 80.

When the charging control processing is started, first, in step S10, the supply voltage Vcha is acquired from the charger 80. In the following step S12, the power supply voltage Vbat is acquired from the power supply voltage detecting unit 24. In the following step S14, it is determined whether the supply voltage Vcha acquired in step S10 is equal to or higher than the power supply voltage Vbat acquired in step S12. Note that, in the present embodiment, the processing in step S10 corresponds to an acquiring unit.

If positive determination is made in step S14, that is, in a case where the supply voltage Vcha is equal to or higher than the power supply voltage Vbat, in step S16, the upper and lower arm switches SCH and SCL of the converter 30 are controlled to be put into off states. In the following step S20, a charging start signal is transmitted to the control device 82 of the charger 80 to start charging the DC power supply 40. By this means, in a state where off states of the upper and lower arm switches SCH and SCL of the converter 30 are maintained, the DC power supply 40 is charged with the supply voltage Vcha.

Meanwhile, if negative determination is made in step S14, that is, on condition that the supply voltage Vcha is lower than the power supply voltage Vbat, in step S18, voltages of the upper and lower arm switches SCH and SCL of the converter 30 are controlled to be stepped up, and the processing proceeds to step S20. In voltage step-up control, while the DC power supply 40 is charged, as a result of states of the upper and lower arm switches SCH and SCL being switched between an on state and an off state, the supply voltage Vcha of the supply power from the charger 80 is stepped up to the stepped-up voltage Vup and output to the DC power supply 40. The stepped-up voltage Vup is a voltage equal to or higher than the power supply voltage Vbat, and the DC power supply 40 is charged with the stepped-up voltage Vup.

In step S22, the power supply voltage Vbat is acquired again. In the following step S24, it is determined whether the power supply voltage Vbat acquired in step S22 has reached a predetermined target voltage Vtg.

If negative determination is made in step S24, since charging of the DC power supply 40 is not finished, the processing returns to step S22. Meanwhile, if positive determination is made in step S24, since charging of the DC power supply 40 is finished, in step S26, the upper and lower arm switches SCH and SCL of the converter 30 are controlled to be put into off states, and the charging control processing is finished.

In the charging control processing, in a case where the supply voltage Vcha is equal to or higher than the power supply voltage Vbat, off states of the upper and lower arm switches SCH and SCL of the converter 30 are maintained. In this case, the supply current Icha from the charger 80 flows through the smoothing reactor 32 and the upper arm diode DCH of the upper arm switch SCH, and, as a result, the DC power supply 40 is charged.

Figure 3:
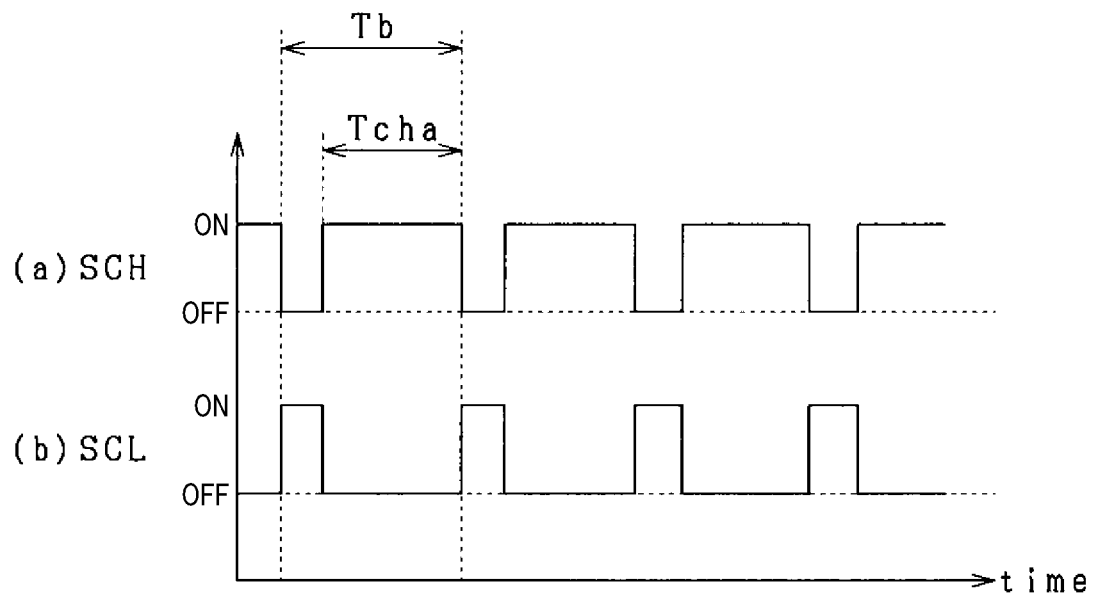
FIG. 3 is a timing diagram illustrating switching patterns of an upper arm and a lower arm in voltage step-up control.

Meanwhile, in a case where the supply voltage Vcha is lower than the power supply voltage Vbat, voltages of the upper and lower arm switches SCH and SCL of the converter 30 are controlled to be stepped up. FIG. 3 illustrates switching patterns of the upper and lower arm switches SCH and SCL in the voltage step-up control. In the voltage step-up control, a period during which the upper and lower arm switches SCH and SCL are put into on states is set in accordance with a ratio of the power supply voltage Vbat with respect to the supply voltage Vcha (hereinafter, a voltage step-up ratio) Vbat/Vcha. For example, if a switching period in a case where the DC power supply 40 is charged is set as Tb, a charging on state period Tcha of the upper arm switch SCH is expressed as expression 2.

$$Tcha = Vcha/Vbat \times Tb \qquad \text{(expression 2)}$$

By this means, the supply voltage Vcha is stepped up to the stepped-up voltage Vup which is substantially equal to the power supply voltage Vbat.

Figure 4:
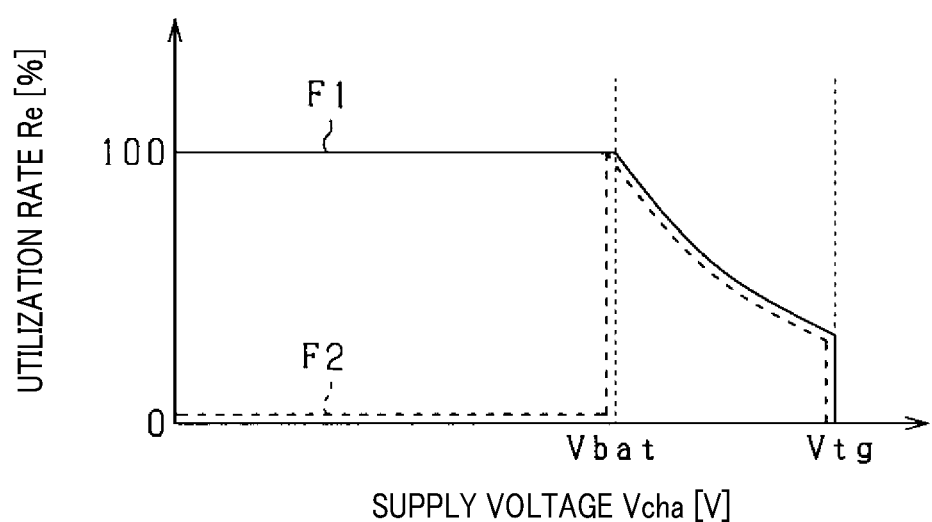
FIG. 4 is a diagram illustrating a relationship between a supply voltage Vcha and a utilization rate Re.

FIG. 4 illustrates a relationship between the supply voltage Vcha of the charger 80 and a charging power utilization rate (hereinafter, simply referred to as a utilization rate) Re. Here, the utilization rate Re indicates a ratio of the supply power used in charging of the DC power supply 40 with respect to maximum supply power of the charger 80. The utilization rate Re is 0 [%] in a case where charging cannot be performed by the charger 80, and is 100 [%] in a case where charging can be performed using maximum supply power of the charger 80.

Note that FIG. 4 illustrates a graph F1 (solid line) indicating the utilization rate Re in the drive system 70 of the present embodiment and a graph F2 (dashed line) indicating the utilization rate Re in a comparative example. The drive system 70 of the present embodiment is different from the comparative example in that, while, in the drive system 70 of the present embodiment, the charging wirings 50H and 50L are connected to the connection points PTH and PTL between the inverter 20 and the converter 30, in the comparative example, the charging wirings 50H and 50L are connected to connection points between the DC power supply 40 and the inverter 20.

As illustrated in FIG. 4, in the comparative example, the utilization rate Re is 0% in a range where the supply voltage Vcha is lower than the power supply voltage Vbat. Meanwhile, in the drive system 70 of the present embodiment, the utilization rate Re is 100% in a range where the supply voltage Vcha is lower than the power supply voltage Vbat. Therefore, in the drive system 70 of the present embodiment, even in a case where the supply voltage Vcha is lower than the power supply voltage Vbat, it is possible to charge the DC power supply 40.

Meanwhile, in a range where the supply voltage Vcha is equal to or higher than the power supply voltage Vbat, it is possible to charge the DC power supply 40 both in the comparative example and in the drive system 70 of the present embodiment. Note that, in a range where the supply voltage Vcha is equal to or higher than the power supply voltage Vbat, as the supply voltage Vcha is higher, the utilization rate Re decreases. This is because, in a case where the supply voltage Vcha is equal to or higher than the power supply voltage Vbat, when the DC power supply 40 is charged by the charger 80, it is necessary to step down the supply voltage Vcha at the charger 80, and the utilization rate Re decreases by this voltage step-down.

According to the present embodiment described in detail above, the following effects can be obtained.

In the drive system 70 of the present embodiment, the second ends of the charging wirings 50H and 50L are connected to the connection points PTH and PTL between the inverter 20 and the converter 30. Therefore, in a case where the DC power supply 40 is charged using the charger 80, it is possible to charge the DC power supply 40 using the converter 30. Accordingly, in a case where the supply voltage Vcha is lower than the power supply voltage Vbat, it is possible to step up the supply voltage Vcha using the converter 30, so that it is possible to make the stepped-up voltage Vup, which is obtained by stepping up the supply voltage Vcha, higher than the power supply voltage Vbat. As a result, even in a case where the supply voltage Vcha is lower than the power supply voltage Vbat, it is possible to charge the DC power supply 40.

Specifically, the control unit 60 controls the converter 30 so that the voltage to be supplied from the charger 80 becomes higher than the power supply voltage Vbat. For example, in a case where the supply voltage Vcha is equal to or higher than the power supply voltage Vbat, the control unit 60 controls the converter 30 so as to output the supply power of the supply voltage Vcha to the DC power supply 40. Further, in a case where the supply voltage Vcha is lower than the power supply voltage Vbat, the control unit 60 controls the converter 30 so as to step up the supply voltage Vcha to the stepped-up voltage Vup and output supply power of the stepped-up voltage Vup to the DC power supply 40. By this means, it is possible to make a voltage to be supplied from the charger 80 higher than the power supply voltage Vbat regardless of which is higher the supply voltage Vcha or the power supply voltage Vbat, so that it is possible to charge the DC power supply 40.

Particularly, in the present embodiment, the converter 30 is a voltage step-down type DC-DC converter. Therefore, voltage step-up control, in which the supply voltage Vcha is stepped up using the converter 30, does not include a voltage step-down step. As described above, if the control includes the voltage step-down step, the utilization rate Re when the DC power supply 40 is charged decreases. In the present embodiment, since the voltage step-up control does not include the voltage step-down step, in a case where the supply voltage Vcha is lower than the power supply voltage Vbat, it is possible to improve the utilization rate Re.

Second Embodiment

Figure 5:
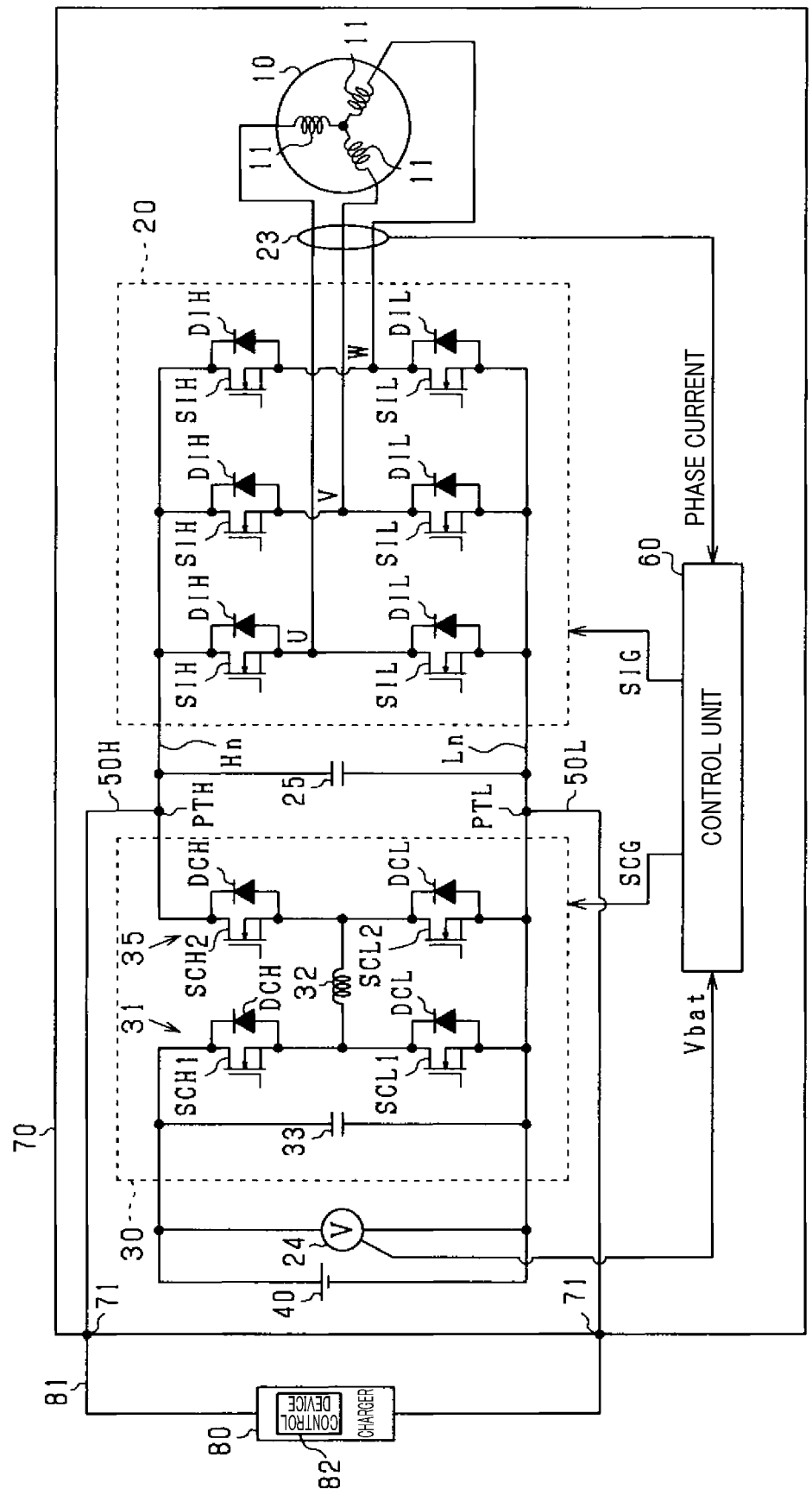
FIG. 5 is an overall configuration diagram of a control system according to a second embodiment.

A second embodiment will be described below mainly concerning differences with the first embodiment with reference to the drawings. The present embodiment is different from the first embodiment in that the converter 30 is a voltage step-up and step-down type DC-DC converter. In FIG. 5, the same reference numerals are assigned to contents which are the same as contents illustrated in previous FIG. 1, and the descriptions will be omitted for convenience sake.

The converter 30 of the present embodiment includes a series connection 35 of the upper arm switch SCH and the lower arm switch SCL. Since the structure of the series connection 35 is the same as the structure of the series connection 31, the description will be omitted. Hereinafter, the upper and lower arm switches SCH and SCL in the series connection 31 will be referred to as a first upper arm switch SCH1 and a first lower arm switch SCL1, and the upper and lower arm switches SCH and SCL in the series connection 35 will be referred to as a first upper arm switch SCH1 and a first lower arm switch SCL1.

Drains of the upper arm switches SIH in the respective phases of the inverter 20 are connected with the drain of the second upper arm switch SCH2. A second end of the smoothing reactor 32 is connected with a connection point between a source of the second upper arm switch SCH2 and a drain of the second lower arm switch SCL2. A negative electrode terminal of the DC power supply 40, a low-voltage side terminal of the first smoothing capacitor 33, and sources of the lower arm switches SIH in the respective phases of the inverter 20 are connected to the source of the second lower arm switch SCL2.

Note that, in the present embodiment, the converter 30 does not include the second smoothing capacitor 34. Meanwhile, the drive system 70 includes a third smoothing capacitor 25. The third smoothing capacitor 25 is provided nearer the inverter 20 than the connection points PTH and PTL are, between the inverter 20 and the converter 30.

In charging control processing of the present embodiment, the second upper arm switch SCH2 is controlled to be put into an on state, and the second lower arm switch SCL2 is controlled to be put into an off state, regardless of which is higher the supply voltage Vcha or the power supply voltage Vbat. By this means, the supply current Icha of the supply power from the charger 80 flows to the series connection 31 through the second upper arm switch SCH2 and the smoothing reactor 32.

According to the present embodiment described above, the converter 30, which is a voltage step-up and step-down type DC-DC converter, controls the second upper arm switch SCH2 to be put into an on state and controls the second lower arm switch SCL2 to be put into an off state, in a case where the DC power supply 40 is charged using the charger 80. That is, in a case where the DC power supply 40 is charged using the charger 80, the control is performed to prevent the supply voltage Vcha from being stepped down. By this means, in a case where the supply voltage Vcha is lower than the power supply voltage Vbat, it is possible to charge the DC power supply 40 by stepping up the supply voltage Vcha using the converter 30, and it is possible to prevent decrease of the utilization rate Re.

Third Embodiment

Figure 6:
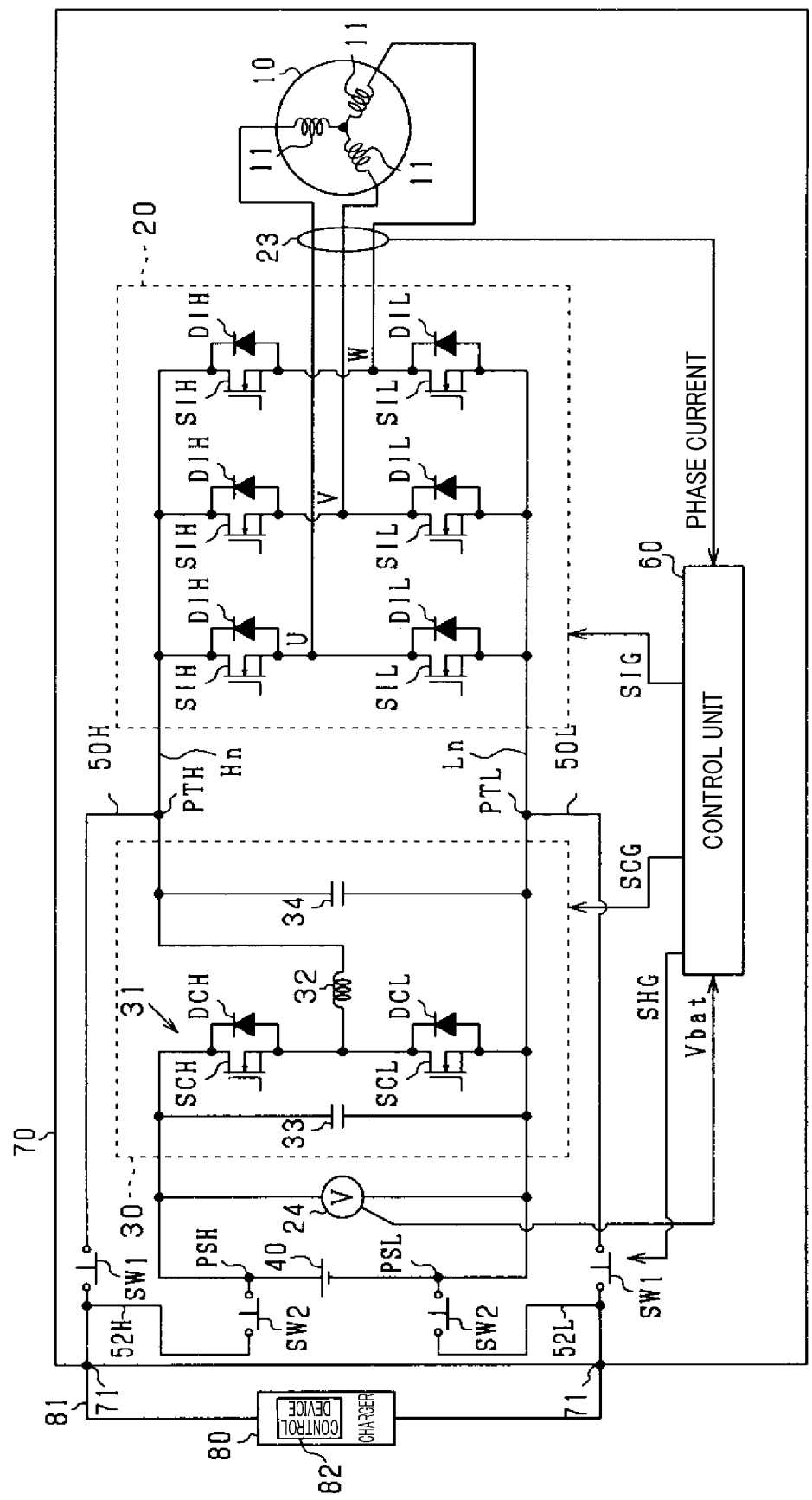
FIG. 6 is an overall configuration diagram of a control system according to a third embodiment.

A third embodiment will be described below mainly concerning differences with the first embodiment with reference to the drawings. The present embodiment is different from the first embodiment in that the drive system 70 includes charging wirings 52H and 52L. In FIG. 6, the same reference numerals are assigned to contents which are the same as contents illustrated in previous FIG. 1, and the descriptions will be omitted for convenience sake. Hereinafter, the charging wirings 50H and 50L will be referred to as first charging wirings 50H and 50L, and the charging wirings 52H and 52L will be referred to as second charging wirings 52H and 52L.

The second charging wirings 52H and 52L are wirings which can be electrically connected to the charger 80, and include a second high-voltage side charging wiring 52H and a second low-voltage side charging wiring 52L. First ends of the second charging wirings 52H and 52L are connected to a charging terminal 71 of the vehicle. Second ends of the second charging wirings 52H and 52L are connected to the DC power supply 40, specifically, connected to connection points PSH and PSL between the DC power supply 40 and the inverter 20.

In detail, the second end of the second high-voltage side charging wiring 52H is connected to the second high-voltage side connection point PSH located between a positive electrode terminal of the DC power supply 40 and the drain of the upper arm switch SCH. Further, the second end of the second low-voltage side charging wiring 52L is connected to the second low-voltage side connection point PSL located between a negative electrode terminal of the DC power supply 40 and a source of the lower arm switch SCL.

First switches SW1 are provided on the first charging wirings 50H and 50L, and second switches SW2 are provided on the second charging wirings 52H and 52L. In the present embodiment, latch relays are used as the respective switches SW1 and SW2. The control unit 60 outputs drive signals SHG corresponding to the first and the second switches SW1 and SW2 to the first and the second switches SW1 and SW2 so as to put one of the first and the second switches SW1 and SW2 into an on state and put the other into an off state in charging control processing of the DC power supply 40.

Figure 7:
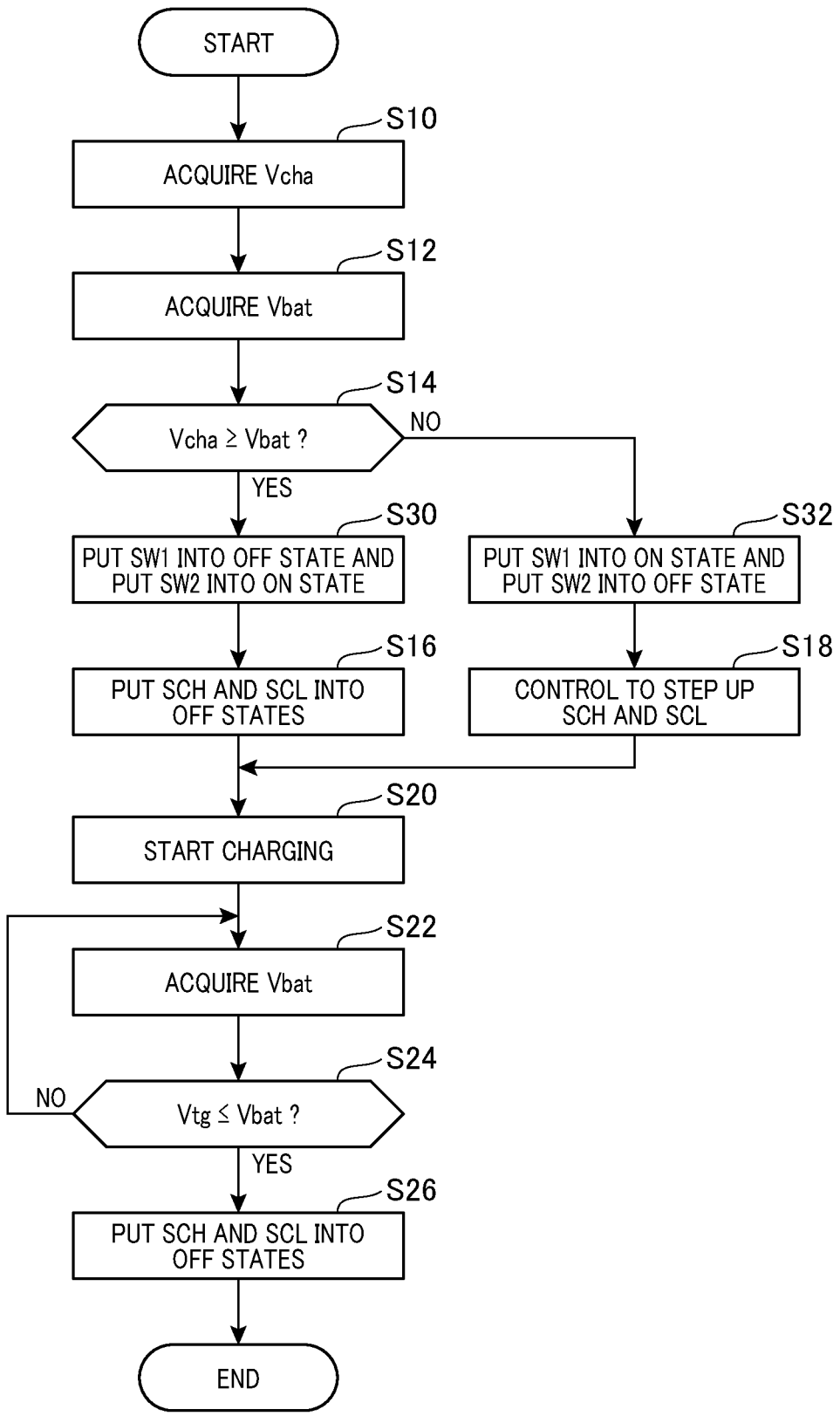
FIG. 7 is a flowchart of charging control processing according to the third embodiment.

FIG. 7 illustrates the charging control processing of the present embodiment. Note that, in FIG. 7, the same step numbers will be assigned to processing which is the same as the processing illustrated in previous FIG. 2, and the descriptions will be omitted for convenience sake.

In the charging control processing of the present embodiment, if positive determination is made in step S14, that is, in a case where the supply voltage Vcha is equal to or higher than the power supply voltage Vbat, in step S30, the first switch SW1 is controlled to be put into an off state, the second switch SW2 is controlled to be put into an on state, and the processing proceeds to step S18. By this means, supply power from the charger 80 is directly supplied to the DC power supply 40 without intervention of the converter 30.

Meanwhile, if negative determination is made in step S14, that is, in a case where the supply voltage Vcha is lower than the power supply voltage Vbat, in step S32, the first switch SW1 is controlled to be put into an on state, the second switch SW2 is controlled to be put into an off state, and the processing proceeds to step S18. By this means, supply power from the charger 80 is supplied to the DC power supply 40 via the converter 30.

According to the present embodiment described above, second ends of the second charging wirings 52H and 52L are connected to the connection points PSH and PSL between the DC power supply 40 and the inverter 20. Therefore, in a case where the DC power supply 40 is charged using the charger 80, it is possible to charge the DC power supply 40 without intervention of the converter 30. Therefore, in a case where the supply voltage Vcha is equal to or higher than the power supply voltage Vbat, it is possible to charge the DC power supply 40 without intervention of the upper and lower arm switches SCH and SCL and the smoothing reactor 32 provided at the converter 30. As a result, it is possible to charge the DC power supply 40 while suppressing loss by these elements.

Other Embodiments

Note that the above-described respective embodiments may be implemented while the embodiments are modified as follows.

In the above-described embodiments, if the supply power from the charger 80 are within an allowable range of power to be charged to the DC power supply 40, the stepped-up voltage Vup may be stepped up to a voltage substantially equal to the target voltage Vtg. In this case, a charging on state period Tcha of the first upper arm switch SCH1 is expressed as expression 3.

$$Tcha = Vcha/Vtg \times Tb \qquad \text{(expression 3)}$$

In the above-described embodiments, it is also possible to provide the first charging wirings 50H and 50L and the second charging wirings 52H and 52L in the drive system 70 using the voltage step-up and step-down type DC-DC converter by combining the second embodiment and the third embodiment.

In the drive system 70 using the step-up and step-down type DC-DC converter, in a case where the first charging wirings 50H and 50L and the second charging wirings 52H and 52L are provided, the following processing is performed in the charging control processing. Specifically, in a case where the supply voltage Vcha is equal to or higher than the power supply voltage Vbat, the first switch SW1 is controlled to be put into an off state, and the second switch SW2 is controlled to be put into an on state. The second upper arm switch SCH2 is controlled to be put into an on state, and the second lower arm switch SCL2 is controlled to be put into an off state. Then, the first upper and lower arm switches SCH1 and SCL1 are controlled to be put into an off state.

Further, in a case where the supply voltage Vcha is lower than the power supply voltage Vbat, the first switch SW1 is controlled to be put into an on state, and the second switch SW2 is controlled to be put into an off state. The second upper arm switch SCH2 is controlled to be put into an on state, and the second lower arm switch SCL2 is controlled to be put into an off state. Then, voltages of the first upper and lower arm switches SCH1 and SCL1 are controlled to be stepped up.

By this means, in a case where the supply voltage Vcha is lower than the power supply voltage Vbat, it is possible to charge the DC power supply 40 by stepping up the supply voltage Vcha using the converter 30, and it is possible to prevent the utilization rate Re from decreasing. Further, in a case where the supply voltage Vcha is equal to or higher than the power supply voltage Vbat, it is possible to charge the DC power supply 40 without intervention of the converter 30 and charge the DC power supply 40 while suppressing loss by elements provided at the converter 30.

The switches provided at the inverter 20 and the converter 30 are not limited to MOSFETs and may be, for example, IGBTs. In this case, it is only necessary to connect a free wheel diode to the IGBT in inverse parallel.

The inverter 20 is not limited to a three-phase inverter, and may be a two-phase inverter or an inverter having four or more phases including series connections of the upper and lower arm switches SIH and SIL of the number corresponding to the number of phases. For example, in a case of two phases, a connection point between the upper and lower arm switches SIH and SIL of a first pair which are connected to each other in series is connected to a connection point between the upper and lower arm switches SIH and SIL of a second pair which are connected to each other in series via an inductive load (for example, a winding).

Hereinafter, aspects of the above-described embodiments will be summarized.

The present disclosure provides a drive system (70) to be applied to a vehicle which includes a chargeable and dischargeable electric storage device (40), and in which the electric storage device is capable of being charged by power supply from an external power supply (80) outside the vehicle, the drive system including a rotating electrical machine (10), an inverter (20) connected to the rotating electrical machine, a converter (30) configured to transform a power supply voltage (Vbat) of the electric storage device and output the transformed power supply voltage to the inverter, and charging wirings (50H, 50L) which are capable of being electrically connected to the external power supply, the charging wirings being connected to connection points (PTH, PTL) between the inverter and the converter.

In a control system according to the present disclosure, the charging wirings are connected to the connection points between the inverter and the converter. Therefore, in a case where the electric storage device is charged using the external power supply, it is possible to charge the electric storage device using the converter. Accordingly, in a case where a supply voltage of the external power supply is lower than the power supply voltage of the electric storage device, it is possible to step up the supply voltage of the external power supply using the converter, so that it is possible to make the stepped-up voltage higher than the power supply voltage. As a result, even in a case where the supply voltage of the external power supply is lower than the power supply voltage of the electric storage device, it is possible to appropriately charge the electric storage device.

What is claimed is:

1. A drive system to be applied to a vehicle which includes a chargeable and dischargeable electric storage device, and in which the electric storage device is capable of being charged by power supply from an external power supply outside the vehicle, the drive system comprising:
   a rotating electrical machine;
   an inverter connected to the rotating electrical machine;
   a converter configured to transform a power supply voltage of the electric storage device and output the transformed power supply voltage to the inverter; and
   charging wirings which are capable of being electrically connected to the external power supply, wherein
   the charging wirings are connected to connection points between the inverter and the converter, and
   the converter is a voltage step-down type converter which steps down the power supply voltage and outputs the stepped-down power supply voltage to the inverter.

2. The drive system according to claim 1, further comprising:
   a control unit configured to control the converter,
   wherein the control unit controls the converter to make a voltage to be supplied from the external power supply higher than the power supply voltage and output the voltage to the electric storage device when the electric storage device is charged by power supply from the external power supply.

3. The drive system according to claim 2, further comprising:
   an acquiring unit configured to acquire a supply voltage of the external power supply,
   wherein the control unit controls the converter to step up a voltage to be supplied from the external power supply and output the voltage to the electric storage device on condition that the supply voltage is lower than the power supply voltage.

4. The drive system according to claim 3, wherein
   the charging wirings are first charging wirings, the charging wirings comprising:
      first switches provided on the first charging wirings;
      second charging wirings which are capable of being electrically connected to the external power supply and which are connected to the electric storage device; and
      second switches provided on the second charging wirings, and
   the control unit controls the first switches to be put into open states and controls the second switches to be put into closed states in a case where the supply voltage is higher than the power supply voltage, and controls the first switches to be put into closed states and controls the second switches to be put into open states in a case where the supply voltage is lower than the power supply voltage.

\* \* \* \* \*